(12) United States Patent
Baschnagel, III

(10) Patent No.: US 6,847,288 B1
(45) Date of Patent: Jan. 25, 2005

(54) SIDE MIRROR RETRACTING VEHICLE ALARM SYSTEM

(76) Inventor: Robert J. Baschnagel, III, 36-17 212th St., Bayside, NY (US) 11361

( * ) Notice: Subject to any disclaimer, the term of this patent is extended or adjusted under 35 U.S.C. 154(b) by 0 days.

(21) Appl. No.: 10/463,453

(22) Filed: Jun. 17, 2003

(51) Int. Cl.$^7$ .............................................. B60R 25/10
(52) U.S. Cl. .............................. 340/426.1; 340/426.12; 340/539.11; 359/841; 359/877; 307/10.2
(58) Field of Search ........................ 340/426.1, 426.12, 340/426.13, 426.17, 539.11; 307/10.2; 359/841, 843, 877; 362/494

(56) References Cited

U.S. PATENT DOCUMENTS

| | | | |
|---|---|---|---|
| 4,657,362 A | | 4/1987 | Suzuki |
| 4,758,078 A | | 7/1988 | Bracamonte |
| 4,786,156 A | | 11/1988 | Kotani et al. |
| 4,998,812 A | | 3/1991 | Hou |
| 5,008,603 A | | 4/1991 | Nakayama et al. |
| 5,640,281 A | * | 6/1997 | Cho ............................. 358/841 |
| 5,677,664 A | * | 10/1997 | Sawinski ............... 340/426.12 |
| 6,109,755 A | | 8/2000 | Duroux et al. |
| 6,267,480 B1 | | 7/2001 | Hirano et al. |
| 6,390,635 B2 | * | 5/2002 | Whitehead et al. ......... 358/872 |
| 6,416,193 B2 | | 7/2002 | Hirano et al. |
| 6,485,155 B1 | * | 11/2002 | Duroux et al. ............... 359/877 |
| 6,585,384 B2 | * | 7/2003 | Nielsen et al. ............... 359/877 |
| 2003/0227779 A1 | * | 12/2003 | Boddy et al. ................ 362/494 |

* cited by examiner

Primary Examiner—Jeffery Hofsass
Assistant Examiner—Eric Blount

(57) ABSTRACT

A side mirror retracting vehicle alarm system for automatically retracting side mirrors of a vehicle while the alarm system is activated includes a vehicle having a side mirror and a side mirror retraction assembly. A vehicle alarm assembly is operationally associated with the vehicle for inhibiting theft of the vehicle. The vehicle alarm assembly includes an activation mechanism for selectively activating the vehicle alarm assembly to a ready state. The mirror retraction assembly is operationally coupled to the activation mechanism of the vehicle alarm assembly such that activation of the vehicle alarm assembly retracts the side mirror. In an embodiment, extension of the side mirror is achieved only by authorized deactivation of the vehicle alarm assembly.

7 Claims, 5 Drawing Sheets

SIDE MIRROR RETRACTING VEHICLE ALARM SYSTEM

BACKGROUND OF THE INVENTION

1. Field of the Invention

The present invention relates to vehicle alarm systems and more particularly pertains to a new side mirror retracting vehicle alarm system for automatically retracting side mirrors of a vehicle while the alarm system is activated.

2. Description of the Prior Art

The use of vehicle alarm systems is known in the prior art. U.S. Pat. No. 5,008,603 discloses an electrically foldable rearview mirror interlocked with door locks and associated with the ignition system of the vehicle. U.S. Pat. No. 5,543,776 issued Aug. 6, 1996, to L'esperance et al. describes a vehicle security system without any suggestion for operational coupling to retracting side mirrors. U.S. Pat. No. 4,786,156 issued Nov. 22, 1988, to Kotani et al. discloses mechanical structure for a retractable side mirror wherein the motor is controlled by a remote control within the vehicle. U.S. Pat. No. 4,657,362 issued Apr. 14, 1987, to Suzuki discloses another mechanical configuration for a retractable side mirror. U.S. patent application Ser. No. 2002/0105740 by Yamaguchi published Aug. 8, 2002, discloses an electrically powered retractable door mirror without any suggestion whatsoever regarding what triggers the control circuit of the motor.

Additional prior art showing various retractable mirror configurations include U.S. Pat. No. 5,640,281 issued to Cho on Jun. 17, 1997; U.S. Pat. No. 6,109,755 issued to Duroux et al. on Aug. 29, 2000; U.S. Pat. No. 6,416,193 issued to Hirano on Jul. 9, 2002; U.S. Pat. No. 6,267,480 issued to Hirano et al. on Jul. 31, 2001; U.S. Pat. No. 4,818,090 issued to Righi on Apr. 4, 1989; U.S. Pat. No. 4,286,840 issued to Covert on Sep. 1, 1981; U.S. Pat. No. 4,998,812 issued to Huo on Mar. 12, 1991; U.S. Pat. No. 4,758,078 issued to Bracamonte on Jul. 19, 1988; and U.S. patent application Ser. No. 2002/0135905 by Yoshida published on Sep. 26, 2002.

While these devices fulfill their respective, particular objectives and requirements, they do not promote the automatic retraction of side mirrors associated with an alarm system.

Manual retraction of side mirrors is often forgotten or may be decided against because of the inconvenience of having to lean to an opposite side of the vehicle or having to walk around to each side of the vehicle to perform the manual retraction. Automated side mirror retraction associated with deactivation of a vehicle engine prevents use of the side mirrors when such use may still be desired. Automated side mirror retraction unassociated with any other action or activity may be unpalatable to vehicle owners as it provides an additional separate task that must be performed. Further, unassociated retraction may be forgotten entirely. When extension of the side mirrors to a use position is not performed prior to starting and moving in a vehicle, a dangerous situation is created. Attempting to extend the side mirrors while simultaneously attempting to operate the vehicle is a potentially dangerous distraction from the responsibilities of safe driving, particularly if extension of the side mirrors is not automated.

There are advantages to retracting side mirrors while a vehicle is unattended. These advantages include providing a more compact profile inhibiting accidental damage to extended side mirrors and discouraging vandalism to the side mirrors of the vehicle. However, use of the side mirrors may still be desired while the vehicle is parked and the engine is turned off. For example, a driver may use a side mirror to monitor a doorway while waiting in the parked vehicle for another person while they are shopping. Thus, automatic retraction of the side mirrors upon shutting off the vehicle engine is undesirable as it requires a driver in this situation to keep the engine activated while the vehicle is not in motion for a potentially extended time, thus wasting fuel and needlessly contributing to atmospheric pollution.

An additional aspect of the present invention provides visual indication that an alarm system has been improperly deactivated. By extending the side mirrors only in response to authorized deactivation of the alarm system, vehicles moving with retracted side mirrors may provide an indication that the vehicle may have been stolen or is being used without authorization from the owner of the vehicle.

SUMMARY OF THE INVENTION

The present invention meets the needs presented above by incorporating mirror retraction into the activation of a vehicle alarm system.

An object of the present invention is to provide a new side mirror retracting vehicle alarm system that automatically retracts the side mirrors of a vehicle while a vehicle alarm system is activated.

Another object of the present invention is to provide a new side mirror retracting vehicle alarm system that protects the side mirrors of a vehicle while the vehicle is unattended.

Yet another object of the present invention is to provide a new side mirror retracting vehicle alarm system that automatically extends the side mirrors into a use position upon deactivation of the vehicle alarm system.

Still another object of the present invention is to provide a new side mirror retracting vehicle alarm system that provides visual indication of unauthorized deactivation of a vehicle alarm system.

To this end, the present invention generally comprises a vehicle alarm system operationally coupled to side mirror retraction assemblies to retract the side mirrors automatically while the alarm system is activated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
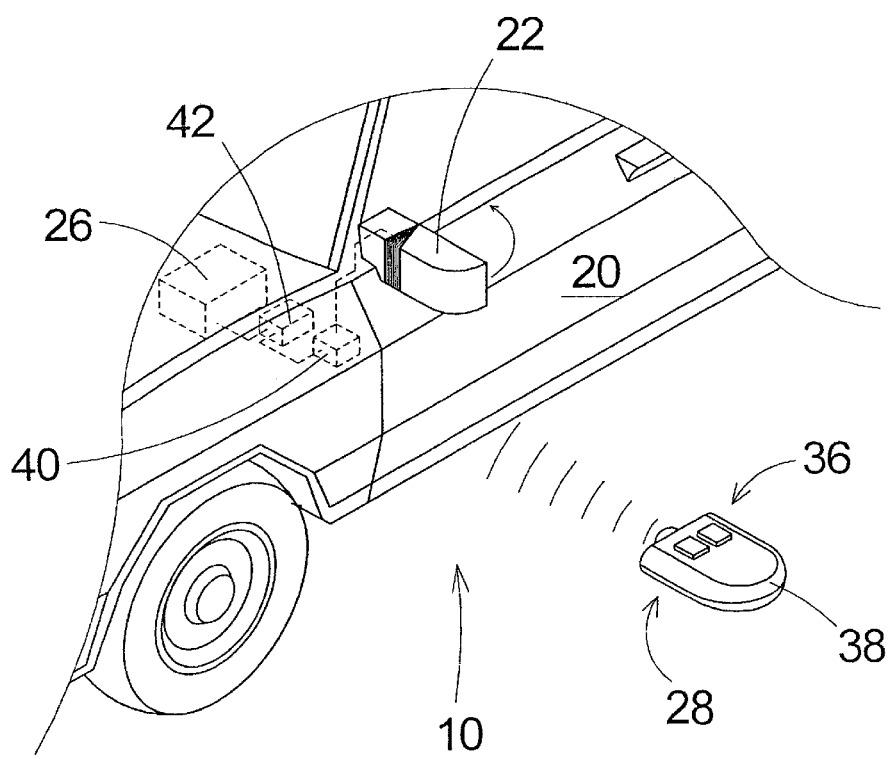
FIG. 1 is a perspective view of a new side mirror retracting vehicle alarm system according to the present invention.
Figure 2:
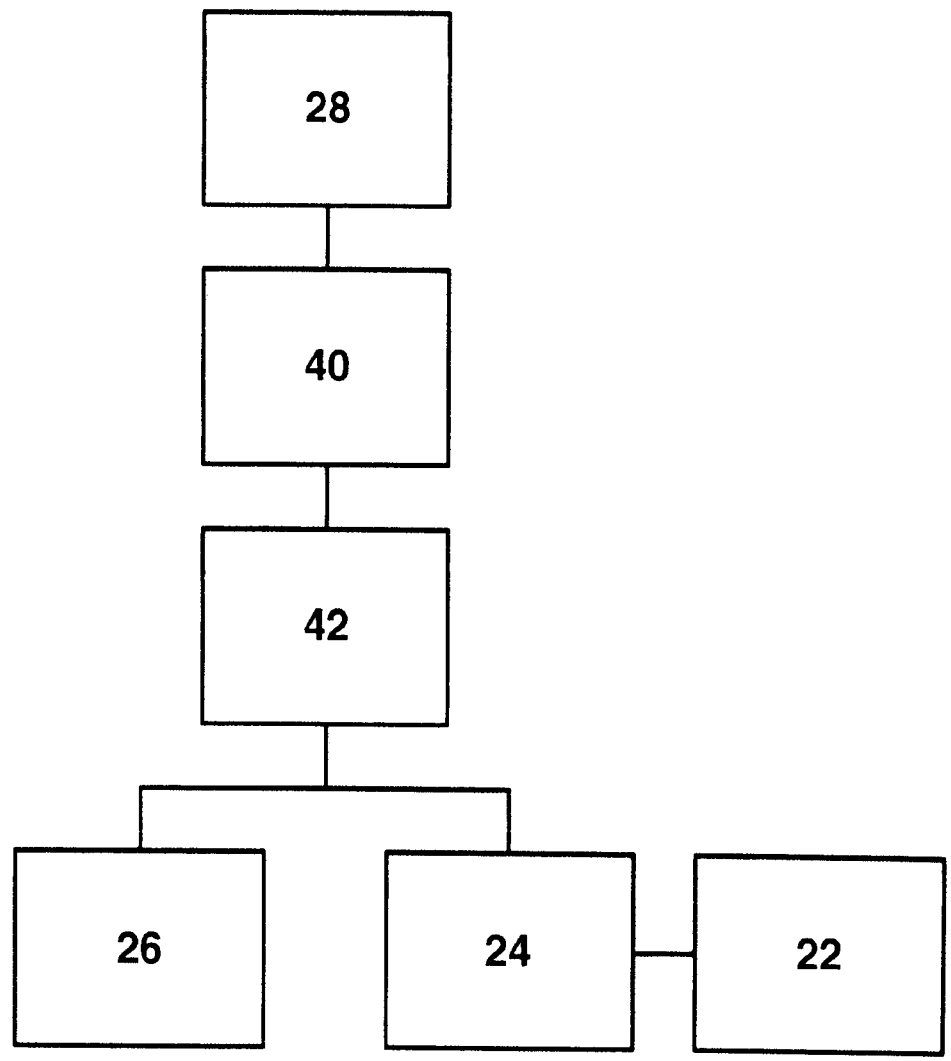
FIG. 2 is a schematic view of the present invention.
Figure 3:
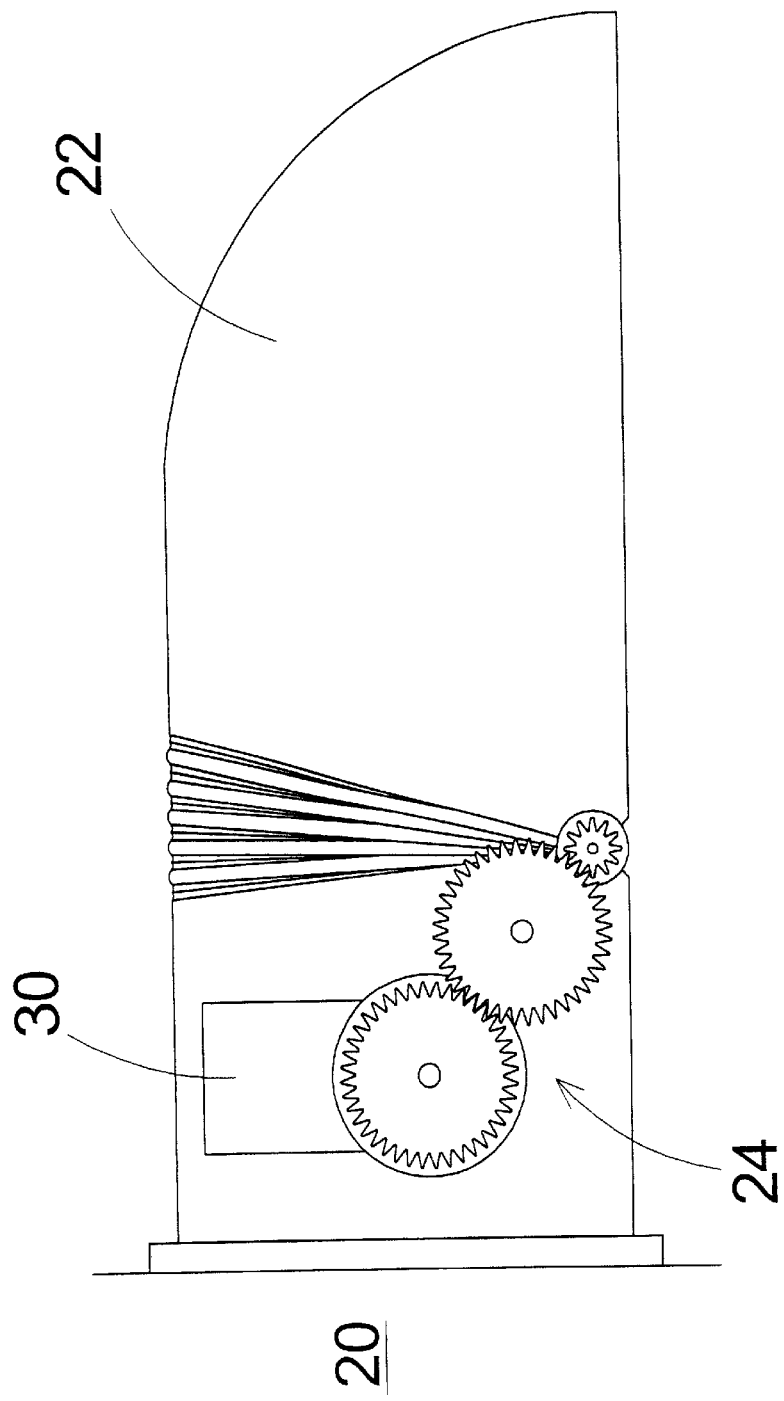
FIG. 3 is a top view of the mirror retraction assembly of the present invention.
Figure 4:
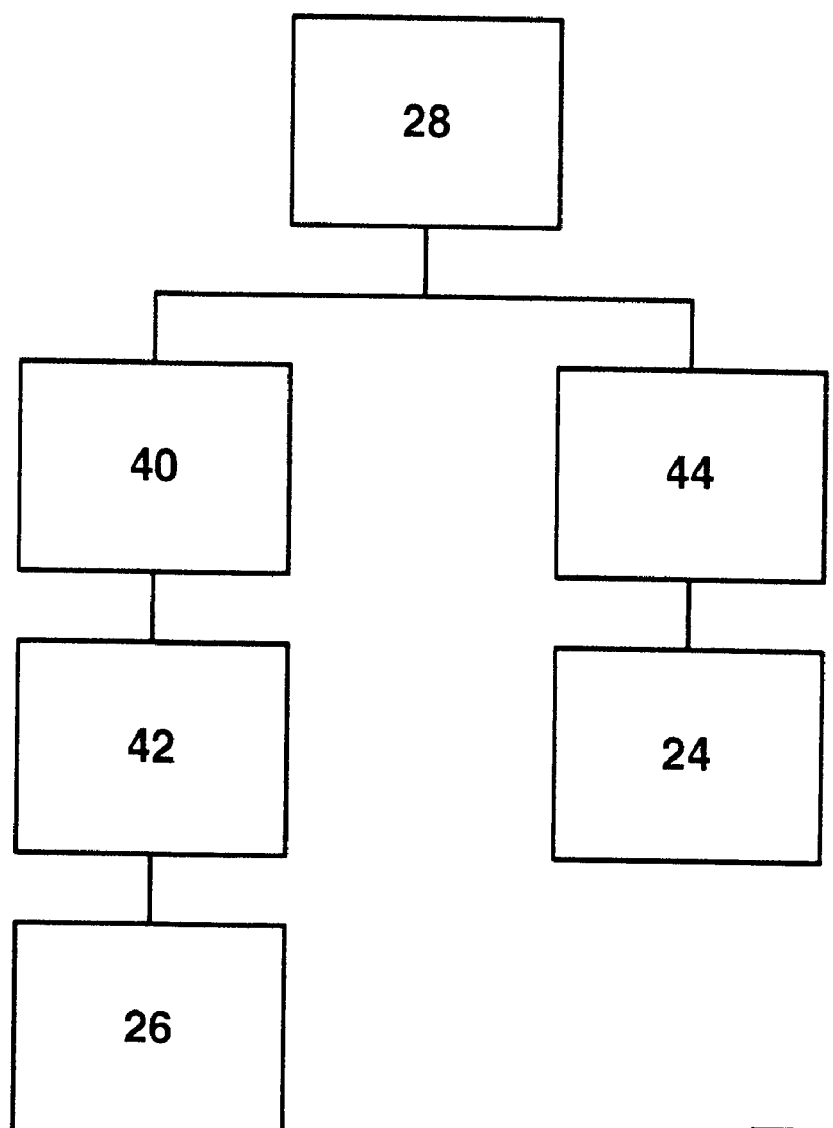
FIG. 4 is a schematic view of an alternate arrangement of the present invention.
Figure 5:
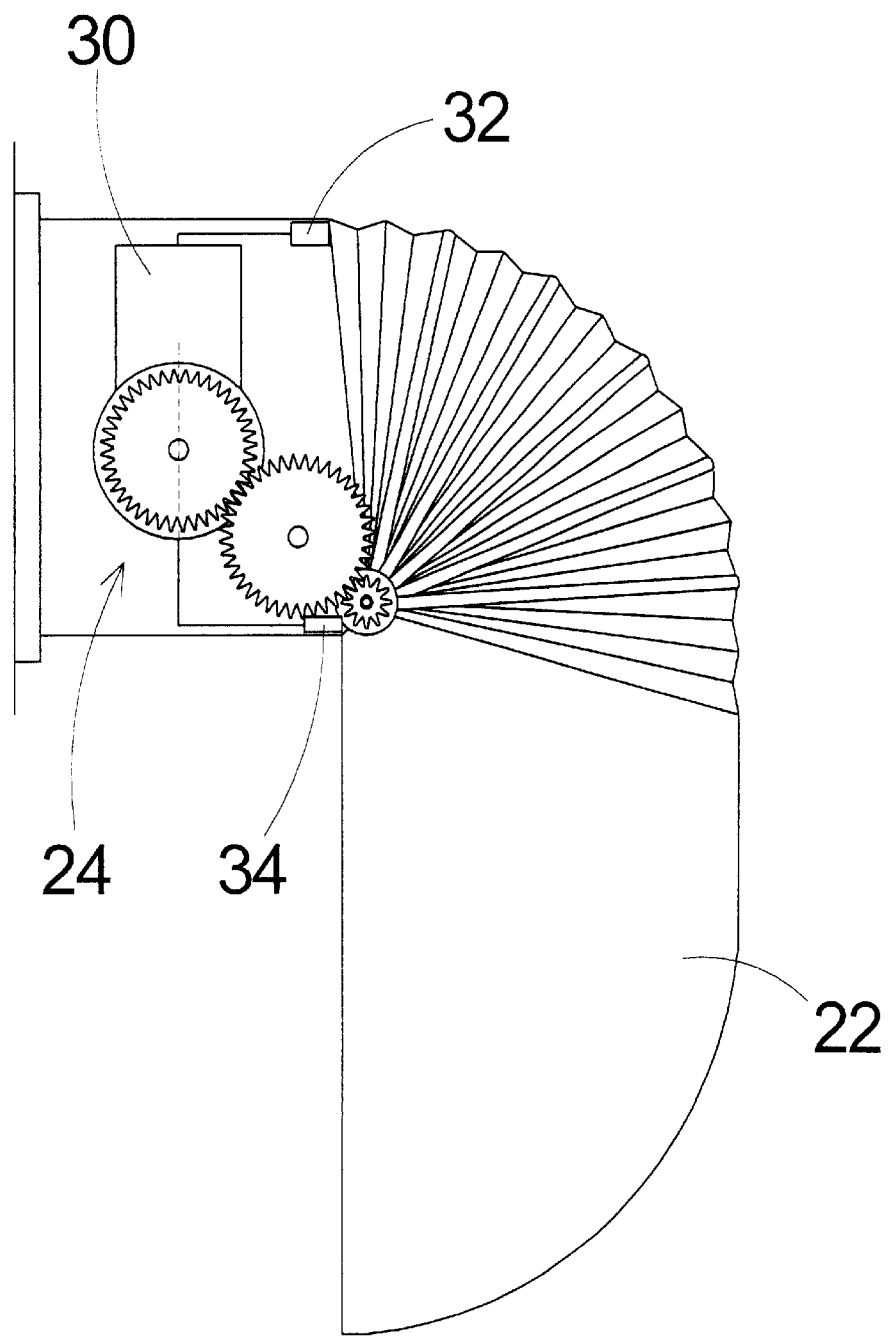
FIG. 5 is a top view of an embodiment of the present invention.

With reference now to the drawings, and in particular to FIGS. 1 through 5 thereof, a new side mirror retracting vehicle alarm system embodying the principles and concepts of the present invention and generally designated by the reference numeral 10 will be described.

As best illustrated in FIGS. 1 through 5, the side mirror retracting vehicle alarm system 10 generally comprises a vehicle 20 having a side mirror 22 and a side mirror retraction assembly 24 operationally coupled to the side mirror 22 for moving the side mirror 22 between an extended position and a retracted position. A vehicle alarm assembly 26 is operationally associated with the vehicle 20 in a manner currently conventionally known for inhibiting theft of the vehicle 20. The vehicle alarm assembly 26 includes an activation mechanism 28 for selectively activating the vehicle alarm assembly 26 to a ready state. The mirror retraction assembly 24 is operationally coupled to the activation mechanism 28 of the vehicle alarm assembly 26 such that activation of the vehicle alarm assembly 26 retracts the side mirror 22.

The side mirror retraction assembly 24 includes a motor 30. In an embodiment, the motor 30 activates for a predetermined duration of time sufficient for moving the side mirror 22 between the extended position and the retracted position.

In an alternate embodiment, the mirror retraction assembly 24 includes an extension sensor 32 and a retraction sensor 34. The retraction sensor 34 is positioned for detecting when the side mirror 22 is in the retracted position. The motor 30 is operationally coupled to the activation mechanism 28, the retraction sensor 34 and the side mirror 22 such that the motor 30 activates upon use of the activation mechanism 28 and remains active to move the side mirror 22 until the retraction sensor 34 detects that the side mirror 22 is in the retracted position.

Similarly, the vehicle alarm system 26 includes a deactivation mechanism 36 and the extension sensor 32 is positioned for detecting when the side mirror 22 is in the extended position. The motor 30 is operationally coupled to the deactivation mechanism 36, the extension sensor 32 and the side mirror 22 such that the motor 30 activates upon use of the deactivation mechanism 36 and remains active to move the side mirror 22 until the extension sensor 32 detects that the side mirror 22 is in the extended position.

The activation mechanism 28 and the deactivation mechanism 36 may be separate or may be incorporated into a single user interface member 38 such as a single RF transmitter button 40 for activating the vehicle alarm assembly 26 when the vehicle alarm assembly 26 is in a deactivated state and deactivating the vehicle alarm assembly 26 when the vehicle alarm assembly 26 is in an activated state.

For remote operation of the vehicle alarm system 26, the vehicle alarm system 26 includes a receiver 40 operationally coupled to a control mechanism 42 such as a microcomputer for activating and deactivating the vehicle alarm system 26 through interaction with the activation mechanism 28 and the deactivation mechanism 36. When combined to provide the single user interface 38, the RF transmitter button is pressed to send a signal to the receiver 40 to prompt the control mechanism 42 to activate and deactivate the vehicle alarm system 26.

Although the mirror retraction assembly 24 may be directly activated by the control mechanism 42, it is also possible and preferred the mirror retraction assembly 24 to include it's own receiver 44 operationally coupled to the deactivation mechanism 36 directly or have the mirror retraction assembly activated through the control mechanism 42 such that the mirror retraction assembly 24 moves the side mirror 22 from the retracted position to the extended position only upon use of the deactivation mechanism 36 and not another form for deactivating the vehicle alarm assembly such as cutting power to the horn or siren. Thus, extension of the side mirror 22 through unauthorized deactivation of the vehicle alarm assembly 26 is inhibited. For such an arrangement, the deactivation mechanism 36 is most preferably portable to be carried by a user to inhibit unauthorized use of the deactivation mechanism 36. However, redundant deactivation mechanisms and/or activation mechanisms may be provided to permit multiple authorized users to operate the vehicle alarm assembly and mirror retraction assembly.

Additionally, separate controls may be provided to permit a user to also operate the mirror retraction assembly independent of the vehicle alarm assembly as is conventionally known as evidenced by some of the prior art cited in this document.

Except where mutually exclusive, it is intended that those skilled in the art may combine the disclosed features into different configurations while keeping within the scope of the invention as defined by the claims.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A side mirror retracting vehicle alarm system comprising:

a vehicle having a side mirror and a side mirror retraction assembly operationally coupled to said side mirror for moving said side mirror between an extended position and a retracted position, said extended position being defined by said side mirror being positioned substantially perpendicular to a longitudinal axis of said vehicle, said retracted position being defined by said side mirror being positioned substantially parallel to the longitudinal axis of said vehicle;

a vehicle alarm assembly operationally associated with said vehicle for inhibiting theft of said vehicle;

said vehicle alarm assembly including an activation mechanism for selectively activating said vehicle alarm assembly to an activated state and a deactivation mechanism for selectively deactivating said vehicle alarm assembly from the activated state;

said mirror retraction assembly being operationally coupled to said activation mechanism of said vehicle alarm assembly such that activation of said vehicle alarm assembly through said activation mechanism retracts said side mirror from said extended position to said retracted position and such that only deactivation of said vehicle alarm assembly through said deactivation mechanism extends said side mirror from said retracted position to said extended position.

2. The side mirror retracting vehicle alarm system of claim 1, further comprising:

said side mirror retraction assembly including a motor and a retraction sensor;

said retraction sensor being positioned for detecting when said side mirror is in said retracted position;

said motor being operationally coupled to said activation mechanism, said retraction sensor and said side mirror such that said motor activates upon use of said activation mechanism and remains active to move said side mirror until said retraction sensor detects that said side mirror is in said retracted position.

3. The side mirror retracting vehicle alarm system of claim 1, further comprising:

said side mirror retraction assembly including a motor and an extension sensor;

said extension sensor being positioned for detecting when said side mirror is in said extended position;

said motor being operationally coupled to said deactivation mechanism, said extension sensor and said side mirror such that said motor activates upon use of said deactivation mechanism and remains active to move said side mirror until said extension sensor detects that said side mirror is in said extended position.

4. The side mirror retracting vehicle alarm system of claim 1, further comprising:

said side mirror retraction assembly including a motor, an extension sensor, and a retraction sensor;

said retraction sensor being positioned for detecting when said side mirror is in said retracted position;

said motor being operationally coupled to said activation mechanism, said retraction sensor and said side mirror such that said motor activates upon use of said activation mechanism and remains active to move said side mirror until said retraction sensor detects that said side mirror is in said retracted position;

said extension sensor being positioned for detecting when said side mirror is in said extended position; and said motor being operationally coupled to said deactivation mechanism, said extension sensor and said side mirror such that said motor activates upon use of said deactivation mechanism and remains active to move said side mirror until said extension sensor detects that said side mirror is in said extended position.

5. The side mirror retracting vehicle alarm system of claim 4 wherein said activation mechanism and said deactivation mechanism are incorporated into a single user interface member for activating said vehicle alarm assembly when said vehicle alarm assembly is in a deactivated state and deactivating said vehicle alarm assembly when said vehicle alarm assembly is in an activated state.

6. The side mirror retracting vehicle alarm system of claim 5 wherein said vehicle alarm system includes a receiver operationally coupled to a control mechanism for activating and deactivating said vehicle alarm system; and wherein said single user interface is an RF transmitter button for sending a signal to said receiver to prompt said control mechanism to activate and deactivate said vehicle alarm system.

7. A side mirror retracting vehicle alarm system comprising:

a vehicle having a side mirror and a side mirror retraction assembly operationally coupled to said side mirror for moving said side mirror between an extended position and a retracted position, said extended position being defined by said side mirror being positioned substantially perpendicular to a longitudinal axis of said vehicle, said retracted position being defined by said side mirror being positioned substantially parallel to the longitudinal axis of said vehicle;

a vehicle alarm assembly operationally associated with said vehicle for inhibiting theft of said vehicle;

said vehicle alarm assembly including an activation mechanism for selectively activating said vehicle alarm assembly to a ready state;

said mirror retraction assembly being operationally coupled to said activation mechanism of said vehicle alarm assembly such that activation of said vehicle alarm assembly retracts said side mirror;

said side mirror retraction assembly including a motor, an extension sensor, and a retraction sensor;

said retraction sensor being positioned for detecting when said side mirror is in said retracted position, said motor activating for a pre-determined duration sufficient for moving said side mirror between said extended position and said retracted position;

said motor being operationally coupled to said activation mechanism, said retraction sensor and said side mirror such that said motor activates upon use of said activation mechanism and remains active to move said side mirror until said retraction sensor detects that said side mirror is in said retracted position;

said vehicle alarm system including a deactivation mechanism;

said extension sensor being positioned for detecting when said side mirror is in said extended position;

said motor being operationally coupled to said deactivation mechanism, said extension sensor and said side mirror such that said motor activates upon use of said deactivation mechanism and remains active to move said side mirror until said extension sensor detects that said side mirror is in said extended position;

wherein said activation mechanism and said deactivation mechanism are incorporated into a single user interface member for activating said vehicle alarm assembly when said vehicle alarm assembly is in a deactivated state and deactivating said vehicle alarm assembly when said vehicle alarm assembly is in an activated state;

wherein said vehicle alarm system includes a receiver operationally coupled to a control mechanism for activating and deactivating said vehicle alarm system;

wherein said single user interface is an RF transmitter button for sending a signal to said receiver to prompt said control mechanism to activate and deactivate said vehicle alarm system; and wherein said mirror retraction assembly is operationally coupled to said deactivation mechanism such that said mirror retraction assembly moves said side mirror from said retracted position to said extended position only upon use of said deactivation mechanism whereby extension of said side mirror through unauthorized deactivation of said vehicle alarm assembly is inhibited.

* * * * *